United States Patent [19]

Busch et al.

[11] 4,263,200

[45] Apr. 21, 1981

[54] FREE FLOWING CHLOROPOLYETHYLENE, ITS MANUFACTURE AND USE

[75] Inventors: Wolfram Busch, Hochheim am Main; Johannes Brandrup, Wiesbaden; Werner Sommer, Bad Soden am Taunus; Horst Semmler, Brühl, all of Fed. Rep. of Germany

[73] Assignee: Hoechst Aktiengesellschaft, Frankfurt am Main, Fed. Rep. of Germany

[21] Appl. No.: 136,824

[22] Filed: Apr. 3, 1980

[30] Foreign Application Priority Data

Apr. 6, 1979 [DE] Fed. Rep. of Germany ....... 2913855

[51] Int. Cl.$^3$ .......................... C08K 3/18; C08K 3/22; C08K 3/34; C08L 23/28
[52] U.S. Cl. ............................ 260/42.49; 260/45.7 R; 525/192; 525/239
[58] Field of Search ................................ 525/239, 192; 260/42.49

[56] References Cited

U.S. PATENT DOCUMENTS

| | | | |
|---|---|---|---|
| 3,227,781 | 1/1966 | Klug et al. | 525/239 |
| 3,928,503 | 12/1975 | Hambsch et al. | 525/239 |
| 3,994,995 | 11/1976 | Frey et al. | 525/239 |
| 4,113,805 | 9/1978 | Frey et al. | 525/239 |

*Primary Examiner*—Carman J. Seccuro
*Attorney, Agent, or Firm*—Curtis, Morris & Safford

[57] ABSTRACT

Free-flowing chloropolyethylene in powder form which keeps this property after prolonged storage and has good processing properties is impregnated substantially on the particle surface with definite amounts of fine-grained vinyl chloride polymer and fine-grained organic substance in a definite proportion. The invention also relates to a process for the manufacture of such an improved chloropolyethylene and the use thereof.

7 Claims, No Drawings

FREE FLOWING CHLOROPOLYETHYLENE, ITS MANUFACTURE AND USE

Polyethylene can be chlorinated to give chloropolyethylene with has a rubber-like consistency and, if definite reaction conditions are observed, can also be fine-grained. In general, such a product is pourable and free-flowing at the beginning but it gradually loses these properties even under normal storing conditions and at normal temperature because of agglomerations with formation of large volume particles which cannot be comminuted again with conventional methods. Such a material can be further processed with difficulty only and with unsatisfactory result.

Attempts have, therefore, been made to improve the stability in storage of such products. According to one method the agglomeration that starts already during chlorination is counteracted by the addition of so-called agglomeration inhibitors. These substances are taken up by the forming chloropolyethylene particles and develop even in the finished product a certain agglomeration inhibiting effect. Examples of additives of this type are talc (cf. U.S. Pat. No. 3,454,544), kaolins, bentonites and Fuller's earths (cf. Japanese patent application No. 72-11,829) and definite fatty acids, optionally together with non ionic detergents (cf. U.S. Pat. No. 3,429,865). It is, however, impossible to obtain with these substances a sufficient stability in storage in practice.

To solve the problem it has also been proposed superficially to impregnate the fine-grained material obtained after chlorination and prior to drying in order to counteract sticking together of the chloropolyethylene under severe storage conditions, for example in a silo under high surface pressures, piling of material in bags over a prolonged period of time and occasionally at temperatures above normal. To this end a series of organic substances is used, for example salts of fatty acids, such as zinc, cadmium, tin, lead and barium stearate (cf. JA-PA Sho No. 46-10,660).

It has been found, however, that considerable amounts of impregnating agent are required to ensure a sufficient stability in storage, but the processing properties are thereby detrimentally affected. High proportions of inorganic additives, which mostly have good adsorption properties, affect the processing viscosity, in many cases they reduce the thermal stability, they increase abrasion in the processing machines and reduce the welding properties of sheets and profiles. The conditions may be especially unfavorable with the use of salts of fatty acids since these compounds have a pronounced lubrifying effect so that the friction conditions for a plastification may be considerably deteriorated.

DE-OS No. 2,260,525 describes a process wherein silicic acid and silicone oil are present as agglomerization inhibitor during chlorination and wherein polyvinyl chloride, optionally together with salts of fatty acids, and salt of phosphorous acid or of silicic acid can be subsequently added to the product to be dried in order to improve the stability in storage. In this publication nothing is said about the amounts used or the particle size. To obtain a sufficient stability in storage considerable amounts are required in this case, too, which involves the aforesaid disadvantages.

It is, therefore, the objective of the present invention to provide a chloropolyethylene which does not have the disadvantages of the state of the art, which, above all, is free-flowing and which does not lose this property even after prolonged storage and simultaneously the processing properties of which are not detrimentally affected.

This problem is solved by a chloropolyethylene impregnated with a mixture of definite fine-grained vinyl chloride polymers and definite fine-grained inorganic additives.

The invention, therefore, provides a pulverulent chloropolyethylene characterized by an average molecular weight $\overline{M}_w$ of $1.2 \times 10^4$ to $4 \times 10^6$, a chlorine content of 20 to 50% by weight and a content of (a) 0.5 to 10 parts by weight, calculated on 100 parts by weight of chloropolyethylene, of fine-grained vinyl chloride polymer having an average particle diameter of 2 to 20 $\mu$m and (b) 0.05 to 2 parts by weight, calculated on 100 parts by weight of chloropolyethylene, of fine-grained, inorganic additives having hydrophobic surface properties, an average particle diameter of at most 10 $\mu$m, an oil number (according to DIN 51,199) of at least 60% and/or a BET surface of at least 100 m$^2$/g, the proportion of additives (a) and (b) being in the range of from 30:1 to 2:1 and the two additives being preponderantly distributed on the surface of the chloropolyethylene particles.

The invention also provides a process for the manufacture of a chloropolyethylene as defined above, wherein said chloropolyethylene is prepared by chlorination of polyethylene having an average molecular weight $\overline{M}_w$ of $1 \times 10^4$ to $2 \times 10^6$, subsequently dried and ground and blended, prior to or after grinding, with known stabilizers, antioxidants and other additives, which comprises mixing the ground pulverulent chloropolyethylene with the two aforesaid additives (a) and (b).

Finally, the invention also relates to the use of such a chloropolyethylene for the manufacture of substance mixtures.

The chloropolyethylene according to the invention preferably has an average molecular weight $\overline{M}_w$ of $3 \times 10^4$ to $5 \times 10^5$, a chlorine content preferably of 30 to 45% by weight, a residual crystallinity of 0 to 30%, preferably 0 to 20%, measured by differential thermoanalysis, a swelling value (according to DE-OS No. 2,343,982) of 10 to 40%, preferably 12 to 35% and a surface hardness according to shore A (DIN 53,505) of 50° to 90°, preferably 55° to 70°. In general, the chloropolyethylene powder has an average particle size of 250 to 500 $\mu$m, preferably 300 to 400 $\mu$m with a particle size distribution between 80% of at most 500 $\mu$m and at most 10% smaller than 50 $\mu$m, preferably 80% of at most 400 $\mu$m and at most 10% smaller than 100 $\mu$m.

Suitable impregnating components (a) are all vinyl chloride polymers having the appropriate fineness and a vinyl chloride content preferably above 80% by weight. More especially, vinyl chloride homopolymers (PVC) are used which have been prepared by known polymerization processes, such a emulsion polymerization, mass polymerization and gas phase polymerization. Especially good results are obtained with emulsion PVC (E-PVC) the emulsifier content of which preferably does not exceed 2% by weight, more preferably 1.5% by weight, and which has substantially hydrophobic properties. In the case of a component (a) having a weaker agglomeration inhibiting effect, for example as a result of less pronounced hydrophobic properties, larger amounts thereof can be used and/or it can be subjected to a subsequent hydrophobization, for example by impregnation of the particles with calcium stearate. In general, the K value of component (a) (DIN 53,726) is in the range of from 60 to 80, preferably 70 to 75, and the average particle diamter is preferably between 5 and 15 μm. The particle size distribution should be in general approximately in a range of from 0.5 μm (1% by weight) and 80 μm (1% by weight), preferably 1 μm (1% by weight) and 50 μm (1% by weight) according to sedimentation analysis. It is likewise possible to use mixtures of different vinyl chloride polymers as component (a).

The claimed amount of component (a) of 0.5 to 10 parts by weight for 100 parts by weight of chloropolyethylene is not critical, smaller or larger amounts can also be used, although this may involve certain disadvantages such as more pronounced agglomeration of the chloropolyethylene particles or higher surface hardness. Preference is given to an amount of 2 to 7 parts by weight.

In general, impregnating component (b) has a higher fineness than component (a), the particle size (primary particles or agglomerates) preferably not exceeding 5 μm and preferably not being lover than 0.1 μm (agglomerates) or 0.01 μm (primary particles). Another characteristic feature of component (b) are the substantially hydrophobic properties which could be obtained, if necessary, by an appropriate surface treatment. The hydrophobia manifests itself in a reduced moisture absorption which is 1/5 to 1/20 of the value of the non-hydrophobized material (cf. Messrs. Degussa "Hydrophobisiertes ®Aerosil"). Still further, component (b) has a high absorptive power expressed by a high oil number of at least 60%, preferably at least 80%. The oil number (oil absorbtion) is measured according to DIN 53,199 as follows:

While stirring with a spatula, about 10 to 30 g of the substance to be tested is mixed dropwise with linseed oil and the point is determined when the pasty mixture has acquired a putty-like consistency and does not smear on glass. The oil number is the amount of linseed oil in g required for 100 g of substance.

In addition to or instead of the high oil number component (b) has a large BET surface of at least 100 m$^2$/g, preferably 100 to 150 m$^2$/g.

Suitable components (b) are, in the first place, aluminum oxide obtained by a pyrogenic process and calcined aluminum silicate subjected to a thermal after-treatment preferably at temperatures above 600° C., which silicate is preferably hydrophobized. Other substances to be used are silicium dioxide obtained by a pyrogenic process, precipitated silicic acid, silicates, above all minerals occuring in nature such as talc, kaolin, pyrophyllite, feldspar, which should be generally hydrophobized. In principle, inorganic additives known as agglomeration inhibiters for chloropolyethylene, for example bentonites, Fuller's earths and the like, can also be used provided that they comply with the above specified conditions.

It is likewise possible to use mixtures of the aforesaid substances as component (b).

The hydrophobization is carried out in known manner by impregnating the substances after drying by heat, for example with silane compounds, preferably dimethyldichlorosilane ((CH$_3$)$_2$Cl$_2$Si), which are preferably used in an amount of 1 to 2% by weight. If the silane compound is liquid it can be used as such or in the form of a solution. The impregnated substance is then aftertreated at elevated temperature, for example at about 400° C. A process of this type (so-called silanization) is described, for example, by H. Brümmer and D. Schutte in Chemiker-Zeitung/Chemische Apparatur 89, page 437, (1965). The powders obtained in this manner have a pronounced hydrophobia and a strongly reduced water absorption.

In addition to silane compounds as hydrophobization agents, there may also be used other compounds known for this purpose, for example stearic acid or the salts thereof, which are preferably added in an amount of 1 to 3% by weight. For drying the material to be impregnated is preheated, for example to 150° to 300° C. and then cooled to about 80° to 120° C. If stearic acid or low melting stearates are directly added they are subsequently melted on the particles to be impregnated. Alternatively, appropriate solutions of the aforesaid compounds may be used.

Component (b) is used in an amount of 0.05 to 2, preferably 0.1 to 0.6 part by weight for 100 parts by weight of chloropolyethylene. In principle, lower or higher amounts may be used although with amounts below 0.05 parts by weight the proportion of component (a) should be increased to such an extent that the product properties are deteriorated.

The proportion of component (a) to component (b) is preferably in the range of from 20:1 to 5:1.

Impregnating components (a) and (b) are substantially distributed on the surface of the chloropolyethylene particles. The term "surface" here preferably indicates the zone down to a depth of about 5 μm, more preferably about 1 μm.

The chloropolyethylene of the invention may further contain the usual additives such as stabilizers, antioxidants, UV-stabilizers, pigments, dyestuffs, fillers, processing auxiliaries and the like, as described, for example, in DE-OS No. 2,456,278, U.S. Pat. No. 3,641,216 or in H. Kainer "Polyvinylchlorid und Vinylchlorid-Mischpolymerisate," Springer Verlag, Berlin, Heidelberg, New York (1965), pages 209 to 258 and 275 to 329.

The chloropolyethylene to be impregnated according to the invention can be obtained by a known chlorination process from polyethylene, for example by chlorination in aqueous suspension, in solution or in the gaseous phase, preferably in suspension at chlorination temperatures which are preferably at least partially above the crystallite melting point of the polyethylene, for example as described in GB Pat. No. 828,938.

The chlorination is preferably started in the temperature range of from 20° to 100° C., more preferably 70° to 90° C., continued at continuously increasing temperature and terminated at temperatures in the range of from 110° to 140° C. Alternatively, the chlorination could be performed as a two stage reaction, i.e. it is started at 20° to 100° C., whereupon the chlorine addition is discontinued while the temperature is raised to 120° C. to 140° C. and then the chlorination is continued and terminated, or the entire chlorination is carried out at 110° to 140° C.

In the suspension process water is used as reaction medium or preferably hydrochloric acid of 10 to 35% strength, especially of 15 to 25% strength. In order to prevent the chloropolyethylene particles formed substantially from coagulating and agglomerating, which may be rather disturbing mainly with increasing chlorine content and decreasing residual crystallite content, known agglomeration inhibitors such as talc, kaolin, silicic acid, powdered quartz, barium sulfate, polyvinyl chloride and the like, should be added. Especially suitable for this purpose is the addition of 0.1 to 1% by weight of silicic acid and 0.01 to 1% by weight of silicone oil (polysiloxane) as described in DE-OS No. 2,260,525.

In general, the chlorination is carried out without use of initiators, although in some cases the presence of such compounds, for example persulfates and peroxides, proves to be of advantage. If desired, the reaction can also be initiated by light or high energy radiation.

Depending on the chlorination program, that is the amount of chlorine added, the temperature program and the reaction time, the chlorine can be statistically distributed whereby a product having a high rubber elasticity can be obtained or the chlorine can be distributed in sequences whereby the flow properties are favorably influenced. The special reaction conditions can be readily determined by the expert in known manner in routine tests.

As starting material for the chlorination all polyethylenes having an average molecular weight $\overline{M}_w$ of $1 \times 10^4$ to $2 \times 10^6$, preferably $2 \times 10^4$ to $3 \times 10^5$ can be used. It is preferred to use polyethylenes produced by low pressure or medium pressure synthesis by the so-called Ziegler or Phillips process, preferably by the former.

Products of this type preferably have a melt index MFI 190/2 of 0.2 to 20 g/10 minutes, a reduced specific viscosity of 1.3 to 25 dl/g (measured in a 0.1 or 0.03% solution in decahydronaphthalene at 135° C.), a density of 0.91 to 0.97 and a softening temperature of 104° to 128° C. Normally, the particle size should be in the range of from 0.1 to 500 μm, preferably 1 to 300 μm.

In special cases it may be of advantage to use high density polyethylene which had been subjected to a thermal treatment or pre-sintered in known manner at a temperature from 100° C. to the crystallite melting point, preferably for 5 to 300 minutes (cf. DE-OS No. 1,720,800).

After chlorination the product is purified and dried in usual manner in order to remove included and superficially bound water, chlorine and hydrochloric acid. The dried product has fine particles and is free-flowing as long as it is not subject to elevated temperature and pressure. If the final product, without being aftertreated according to the invention, is stored in a silo or filled in bags and piled in a store house the chloropolyethylene agglomerates and cakes together more or less rapidly under the given pressure conditions, especially at storage temperatures above +15° C. The consequences are, in part, rather serious in that it is difficult to empty the containers and the product becomes more and more heterogeneous. Once agglomerated in this manner the products cannot be comminuted again or comminuted with considerable expenditure only.

The chloropolyethylene is dried in the usual devices, for example by whirl drying with preheated air in a corrosion-resistant tower with stirrer, and then milled in the usual devices, for example in impact disk mills or rapid mixers with crushing means.

The dried and milled chloropolyethylene is impregnated with components (a) and (b) in devices known for this purpose such as fluid mixers rotating at 400 to 1,200 rpm. The speed of rotation shoule be chosen in dependence on the consistency of the material to be mixed so that stronger heating by frictional heat is avoided. In some cases it may be advantageous to cool the mixer from the outside. It may also be advantageous to add at this point additional stabilizer in order to avoid a possible damage of the polymer with the occurence of local superheating, if any. Alternatively, the total amount of stabilizer and other additives such as antioxidants, UV-absorber, dyestuffs, pigments, processing auxiliaries and the like, could be added in this stage. In principle, impregnation of the chloropolyethylene can be carried out also continuously.

Components (a) and (b) are relatively rapidly adsorbed by the surface of the slightly sticky chloropolyethylene so that short mixing times in the range of from about 1 to 10 minutes, preferably 2 to 6 minutes are sufficient. The impregnating agents to be used according to the invention firmly adhere to the particle surfaces and are not removed therefrom if another comminution of the material should become necessary after impregnation.

The chloropolyethylene powders according to the invention are free-flowing and have a good stability in storage, that is to say the flow properties are not affected to a noticeable extent even after prolonged storage under the usual pressure and temperature conditions. The processing properties are not detrimentally affected either by the surface impregnation of the invention.

The following examples illustrate the invention.

EXAMPLE 1

The chloropolyethylene powder used has been prepared from a high density polyethylene having an average molecular weight $\overline{M}_w$ of 0.5 to $10^5$, a range of distribution $\overline{M}_w/M_n$ of 6 by chlorination in hydrochloric acid suspension at a temperature of from 20° to 125° C. with subsequent drying and milling. The chloropolyethylene had an average molecular weight of $1 \times 10^5$, a residual crystallinity of 10%, a chlorine content of 42% by weight with statistical chlorine distribution. In a fluid mixer rotating at 600 rpm the chloropolyethylene powder, 80% of the particles of which had a diameter of at most 300 μm and at most 5% of which had a diameter inferior to 50 μm, was blended at room temperature with external cooling with a fine-grained powder mixture consisting of E-PVC having an average particle size of 10 μm, a K value of 70 and an apparent density of 0.45 g/cc and aluminum oxide produced by a pyrogenic process with a primary particle size of 20 nm and a specific BET surface of $100 \pm 10$ m$^2$. E-PVC was added in an amount of 3% by weight and the aluminum oxide in an amount of 0.3% by weight, each calculated on the chloropolyethylene. The mixing conditions as specified above prevented the material from stronger heating. Impregnating was terminated after a mixing time of 3 minutes, that is to say after that time the PVC/aluminum oxide mixture had been adsorbed and fixed on the chloropolyethylene surface.

For determining the tendency to agglomeration the product obtained was then stored for 2 days at 40° C. under a surface pressure of 0.6 N/cm$^2$, corresponding to the surface pressure excerted on the lowest bag on a loaded pallet. The material was naturally compacted to a certain degree, but it did not cake together. The entire content of the bag could be transformed into a free-flowing powder by simple methods, such as rolling of the bag or short time disaggregation in a rapid mixer.

In addition to this test which simulates practical conditions, the tendency to agglomeration was tested by the following method:

50 g of the fine-grained material (average particle size 450 μm) was compressed for 2 days at 40° C. in a tube closed at one end and having an internal diameter of 40 mm by means of a plunger having a weight of 750 g. After termination of the test, the material in tablet (cylinder) form was taken out and the resistance to breaking of the tablet was measured. To this end the tablet was supported on opposed edges (supporting distance 4 cm) and the center loaded with a gradually increasing weight of small diameter. The load under which the tablet broke in relationship to the tablet diameter was the measure of the breaking strength (N/mm$^2$). A tablet made from the chloropolyethylene according to the invention had a breaking strength of 0 N/mm$^2$. To the test the desagglomeration of another tablet obtained as described above said tablet was placed on a sieve having a mesh width of 1.5 mm$^2$ and the abrasion was determined under definite shaking motions (DIN 53,734). After shaking for 5 minutes the tablet was completely disintegrated, that is to say no compact portions remained behind, which indicated a 100% abrasion.

COMPARATIVE EXAMPLE 1

The agglomeration of the chloropolyethylene of Example 1 which had not been impregnated was determined. The more qualitative test simulating practical conditions indicated that the product had completely caked together and could not be disintegrated again to the original particle size by the usual comminuting devices, for example impact disk mills or rapid mixers with crushing means. After disintegration, the product still contained particles of large volume which could be conveyed with difficulty only and further processed. Inspite of the excellent rubber-elastic properties, the untreated chloropolyethylene was practically useless because of the poor storing properties.

The second testing method according to Example 1 gave the following value: tablet resistance 0.12 N/mm$^2$, abrasion 60% after 5 minutes.

EXAMPLE 2

In this example a chloropolyethylene powder prepared from high density polyethylene having an average molecular weight $\overline{M}_w$ of $0.9 \times 10^5$ and a range of distribution $\overline{M}_w/\overline{M}_n$ of 10 by chlorination in hydrochloric acid suspension at a temperature of 90° to 130° C. using potassium persulfate as initiator and silicone oil and silicic acid as agglomeration inhibitor was used. The chloropolyethylene had an average molecular weight of $1.4 \times 10^5$, a chlorine content of 36% by weight, a degree of fineness after drying and milling of 80% equal to or smaller than 250 μm and about 10% equal to or smaller than 50 μm and a residual crystallinity of 2%, with statistical distribution of chlorine.

In the manner described in Example 1, the chloropolyethylene was blended in a fluid mixer with a fine-grained mixture of E-PVC having an average particle size of 15 μm, a K value of 75 and an apparent density of 0.4 g/cc and silicic acid obtained by a pyrogenic process and having a primary particle size of about 30 nm and a specific BET surface of 110 m$^2$/g, which silicic acid had been hydrophobized by impregnation with 1% by weight of dimethyldichlorosilane. The amount of E-PVC was 6% by weight and the amount of silicic acid 1% by weight, each calculated on the chloropolyethylene.

The product obtained was stored for 1 week at room temperature under a surface pressure of about 0.6 N/cm$^2$. After that time the product was compacted but had not caked together so that it could be easily disintegrated again by rolling or impact on the bags. The fine-grained and free-flowing powder thus obtained had the original particle size distribution and could be readily extruded or calendered.

The results of the testing methods as described in Example 1 were as follows: breaking strength 0 N/mm$^2$, abrasion after 5 minutes 100%.

COMPARATIVE EXAMPLE 2

Example 2 was repeated with the exception that the chloropolyethylene was not impregnated according to the invention.

After storage under the conditons specified in Example 2, the product had completely caked together and could no longer be disintegrated into powder form by known methods.

The breaking strength of the table was 0.19 N/mm$^2$ and the abrasion after 5 minutes was 70%.

EXAMPLE 3

The chloropolyethylene used in this example was obtained by chlorinating a high density polyethylene having an average molecular weight of $1.8 \times 10^5$ and a range of distribution $\overline{M}_w/\overline{M}_n$ of 5 in hydrochloric acid suspension at a temperature of from room temperature in 132° C. The chloropolyethylene had an average molecular weight of $3.0 \times 10^5$, a chlorine content of 39% by weight, a fineness after drying and milling of 80% equal to or smaller than 400 μm and 0% equal to or smaller than 50 μm and a residual crystallinity of 0% with a statistical chlorine distribution.

The above chloropolyethylene powder was impregnated as described in Example 1 with a mixture of E-PVC having an average particle size of 8 μm, a K value of 74 and an apparent density of 0.5 g/cc and kaolin having an average particle size of 0.5 82 m which had been hydrophobized with 1% by weight of dimethyldichlorosilane and the oil absorption number of which was found to be 64. The E-PVC was used in an amount of 5% by weight and the amount of kaolin was 0.3% by weight, calculated on the chloropolyethylene.

To determine the tendency to agglomeration the product was stored at 30° C. under a surface pressure of 0.6 N/cm$^2$ for one week. The results corresponded to those of Example 2. The tablet strength (0 N/mm$^2$) and the abrasion (100%) were also the same as in Example 2.

COMPARATIVE EXAMPLE 3

Example 3 was repeated with the exception that the chloropolyethylene was not impregnated. In the storage test as defined above the product sintered completely and could be disintegrated in a rotary cutter only, but the product obtained in this manner was coarser than the starting chloropolyethylene. The larger particles had a detrimental effect, for example when the product was fed to an extruder and subsequently calendered. Because of the unsatisfactory pressure build-up during plastification the material was not uniformly preheated which fact had, for example, a detrimental effect on the product quality.

The tablet strength and abrasion were found to be 0.07 N/mm$^2$ and 79%.

What is claimed is:

1. Pulverulent chloropolyethylene characterized by an average molecular weight $\overline{M}_w$ of $1.2 \times 10^4$ to $4 \times 10^6$, a chlorine content of 20 to 50% by weight and a content of (a) 0.5 to 10 parts by weight, calculated on 100 parts by weight of chloropolyethylene, of fine-grained vinyl chloride polymer having an average particle diameter of 2 to 20 μm and (b) 0.05 to 2 parts by weight, calculated on 100 parts by weight of chloropolyethylene, of fine-grained, inorganic additives having hydrophobic surface properties, an average particle diameter of at most 10 μm, an oil number (according to DIN 51,199) of at least 60% and/or a BET surface of at least 100 m$^2$/g, the proportion of additives (a) and (b) being in the range of from 30:1 to 2:1 and the two additives being preponderantly distributed on the surface of the chloropolyethylene particles.

2. Chloropolyethylene as claimed in claim 1, wherein the residual crystallinity is from 0 to 30%, calculated on the degree of crystallinity of the polyethylene used for its manufacture.

3. Chloropolyethylene as claimed in claim 1 or 2, wherein the chlorine is statistically distributed.

4. Chloropolyethylene as claimed in claims 1 or 2, containing 0.3 to 0.6 part by weight of inorganic additive for 100 parts by weight of chloropolyethylene.

5. Chloropolyethylene as claimed in claims 1 or 2, wherein the inorganic additive is aluminum oxide produced by a pyrogenic process, silanized silicium dioxide, silanized and calcined aluminum silicate, or silanized kaolin.

6. Process for the manufacture of a chloropolyethylene as claimed in claims 1 or 2, wherein said chloropolyethylene is prepared by chlorination of polyethylene having an average molecular weight $\overline{M}_w$ of $1 \times 10^4$ to $2 \times 10^6$, subsequently dried and ground and blended, prior to or after grinding, with known stabilizers, antioxidants and other additives, which comprises mixing the ground pulverulent chloropolyethylene with the additives (a) and (b).

7. Use of a chloropolyethylene as claimed in claims 1 or 2 for the manufacture of substance mixtures optionally containing, in addition to said chloropolyethylene, stabilizers and other known additives.

* * * * *